United States Patent [19]

Vaginay

[11] 3,954,902
[45] May 4, 1976

[54] POLYESTERS WITH GOOD DYEING AFFINITY AND A PROCESS FOR OBTAINING SAME

[75] Inventor: Yves Vaginay, Lyon, France

[73] Assignee: Rhone-Poulenc-Textile, Paris, France

[22] Filed: Mar. 19, 1975

[21] Appl. No.: 559,792

Related U.S. Application Data

[63] Continuation-in-part of Ser. No. 486,499, July 8, 1974, abandoned, which is a continuation of Ser. No. 255,201, May 22, 1972, abandoned.

[30] Foreign Application Priority Data

May 24, 1971 France................ 71.18744

[52] U.S. Cl.................. 260/860; 260/75 N
[51] Int. Cl.²......................... C08G 39/02
[58] Field of Search.................. 260/860, 75 N

[56] References Cited
UNITED STATES PATENTS

| | | | |
|---|---|---|---|
| 2,744,086 | 5/1956 | Mowry et al................ | 260/45.4 |
| 2,891,929 | 6/1959 | Caldwell...................... | 260/75 N |
| 3,039,998 | 6/1962 | Boerma........................ | 260/75 |
| 3,325,454 | 6/1967 | Nakamura et al............ | 260/75 |

Primary Examiner—Murray Tillman
Assistant Examiner—T. Pertilla
Attorney, Agent, or Firm—Stevens, Davis, Miller & Mosher

[57] ABSTRACT

Polyesters having improved affinity for acid dyes are produced by incorporation, in the polyester-forming dicarboxylic acid and dihydric alcohols, quaternary ammonium compounds of the formula

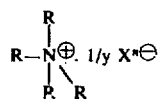

wherein the R's represent aliphatic, cycloaliphatic or aromatic radicals, at least one R being substituted by at least a group capable of forming ester bonds with the recurring polyester units, at least two R's being capable of forming between them a ring which may contain quaternizable nitrogen atoms; and where:

$X^{n-}$ is a stable anion of valency $n$ of an organic acid or of a mineral oxyacid; and where:

$y$ is an integer equal to the valence of the anion.

The resulting composition is melt spinnable.

13 Claims, No Drawings

POLYESTERS WITH GOOD DYEING AFFINITY AND A PROCESS FOR OBTAINING SAME

This application is a continuation-in-part of copending application Ser. No. 486,499 filed July 8, 1974 now abandoned which is a continuation of application Ser. No. 255,201, filed May 22, 1972, and now abandoned.

This invention relates to new polyester-based polymers possessing good dyeing affinity for acid dyes. The invention also applies to a process for producing these fiber-forming polyesters.

Polyesters derived from aromatic dicarboxylic acids, and in particular from terephthalic acid and from aliphatic or cycloaliphatic dihydric alcohols have become of great commercial applicability in many uses because of their great toughness, their elasticity, their wrinkle-resistance, etc. However, the threads and fibers obtained from these polyester are difficult to dye because of the lack of reactive sites in or on the macromolecular chains.

Acid dyes are a category that holds particular interest in view of their light-fastness and also because of their low cost. Unfortunately, in contrast to the polyamides, for instance polyesters provide no affinity whatever for these kinds of dyes.

U.S. Pat. No. 2,891,929 has proposed introducing aminated groupings into the polyester by replacing part of the diacid by an aminated one during condensation of the diacid with dihydric alcohol. But the polymers so obtained are subject to a pronounced tendency to yellow during the heat treatments they undergo during processing.

It has also been proposed that during the interchange of raw materials or during the polycondensation leading to polyester formation, a mixture of an alkaline earth metal and of quaternary ammonium halide be mixed with the reagents. The polyesters so obtained provide good transparency and resistance to heat, but they do not offer any significant or particular dyeing affinity.

In U.S. Pat. No. 3,325,454 a process has been proposed for preparing polyethylene terephthalate by directly esterifying terephthalic acid with ethylene glycol followed by polycondensation of the resulting product, whereby formation of ether bonds is prevented and a polymer of high softening point is obtained by adding, prior to completion of said esterification reaction, 0.0005 to 1.0 mol percent of a quaternary ammonium compound.

However, when such a quaternary ammonium compound is added during esterification, it is decomposed into amines so that the carboxylic groups are neutralized thus preventing the formation of ether bonds. The prepared polyester contains none of said compound.

In U.S. Pat. No. 3,039,998 a process has also been proposed to prepare polyethylene terephthalate with a greater resistance to thermal degradation in which at least the ester interchange is carried out in the presence of organic bases or their salts such as quaternary ammonium compounds as catalysts, in an amount of less than 1% by weight of dimethyl terephthalate.

As in U.S. Pat. No. 3,325,454, these compounds are decomposed into amines and the quaternary ammonium compounds are not contained in the polymer.

The present inventor has now developed novel fiber-forming polyesters derived from at least one aromatic dicarboxylic acid and a dihydric alcohol, said polyester containing with respect to the total of the recurring units of the polyesters, 1 – 10% of units issuing from a product having the formula

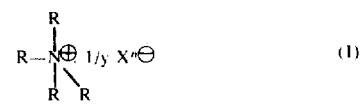

wherein the R's are aliphatic, aromatic or cycloaliphatic radicals, at least one R being substituted by at least a group capable of forming ester bonds with the recurring polyester units, the total number of said ester bonds forming groups being no greater than three. Two or three of the R's may form a ring which may contain other quaternizable nitrogen atoms. Any two R's may be identical, and, in fact, the four R's may comprise two pairs wherein an R of each pair is identical to the other R of that pair. In the above formula, $X^{n-}$ represents a stable anion of valence $n$ of an organic acid or a mineral oxyacid and $y$ is an integer equal to the valence of the anion.

The present invention also relates to a process for producing the above-described polyesters by polycondensing, in the presence of 1 – 10% mols with respect to the number of mols of the dicarboxylic acid or its derivative, of a product of formula (I), such product being added preferably at the end of or after interchange, of at least a derivative of at least one aromatic dicarboxylic acid with aliphatic or cycloaliphatic dihydric alchols, or after the esterifying step of at least one aromatic dicarboxylic acid with aliphatic or cycloaliphatic dihydric alcohols. If desired, a small quantity of aliphatic dicarboxylic acid and/or a polyethylene glycol may be added to the reaction mixture in order to modify slightly the properties of the polyester produced. The aliphatic carboxylic acid can be added in amounts of 1 to 10%.

Furthermore, if desired, product (I) may be condensed with a dicarboxylic acid or a derivative thereof that may be aliphatic or aromatic in order to generate a polymer which may be added at any time during the condensation described above, or which may be merely mixed with a conventional polyester for the purpose of improving its dyeing affinity.

The aromatic dicarboxylic acids which are used in the formation of the instant polyesters are generally well-known and preferably contain from about 8 to about 14 carbon atoms. The dicarboxylic acids or esters thereof may be represented by the formula

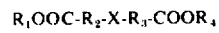

wherein $R_1$ and $R_4$ each represent hydrogen or an alkyl radical containing from 1 to 10 carbon atoms and $R_2$ and $R_3$ each represent $(CH_2)_{m-1}$, wherein $m$ is an integer of from 1 – 5 inclusive, and X represents a divalent aromatic radical of the formula

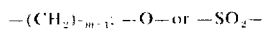

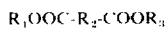

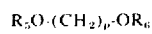 and;

Y represents a radical of the formula $$-(CH_2)_{m-1}, -O- \text{ or } -SO_2-$$

Though terephthalic acid and its alkyl esters are preferred, any of the other above acids or esters of such acids can be employed with good results.

As indicated above, small quantities of an aliphatic dicarboxylic acid and/or of a polyethylene glycol may be included in the reaction mixture to modify the properties of the polyester. The aliphatic dicarboxylic acids or esters thereof are represented by the formula $$R_1OOC-R_2-COOR_3$$

wherein $R_1$ and $R_3$ are either hydrogen or alkyl radicals containing from 1 to 10 carbon atoms, and $R_2$ is an aliphatic hydrocarbon radical. Thus, typical aliphatic dibasic dicarboxylic acids which can be employed include oxalic acid, succinic acid, adipic acid, sebacic acid, α,α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

In general, the preferred aliphatic dicarboxylic acids contain from about 6 to about 12 carbon atoms.

The dihydric alcohols or esters thereof which may be employed in forming the instant polyesters may be aliphatic or cycloaliphatic. The aliphatic alcohols may be represented by the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms, the polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols.

Cycloaliphatic alcohols may be represented, for example, by the formula

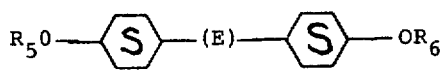

wherein $R_5$ and $R_6$ are as previously described and E is a branched or straight chain alkyl group having 1 to 5 carbon atoms. One such dihydric alcohol which is preferred is bis(4-hydroxycyclohexyl)-2-2-propane. The cycloaliphatic alcohols may also be represented by the formula

wherein $q$ is an integer of 1 – 5. A preferred example of such alcohols is cyclohexane dimethane diol.

The formation of the polyesters is, per se, a well known procedure and as previously indicated, is described in U.S. Pat. No. 2,891,929. The proportions of dicarboxylic acid or derivative thereof and dihydric alcohol may be varied over a fairly wide range, but, in general, the dihydric alcohol is used in excess amounts of up to about 5 times.

In the formula (1) listed above, R may be an aliphatic group represented by the formula —(CH$_2$)$_a$-Z wherein $a$ is an integer from 1 to 12, and Z = H, COOH, COOR', OH and wherein R' is an alkyl of 1 to 10 carbon atoms, or R may be an aromatic radical represented by the formula

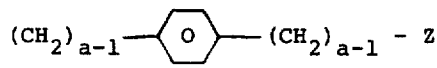

wherein $a$ and Z have the same significance as above. R may also be a cycloaliphatic radical represented by the formula

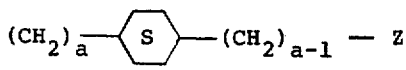

wherein $a$ and Z have the same meaning as above. Two or three R radicals may together form a cycle which may contain nitrogen atoms that can be rendered quaternary as is stated above. Representative of such cyclic formation are the following wherein a and Z have the same significance as above.

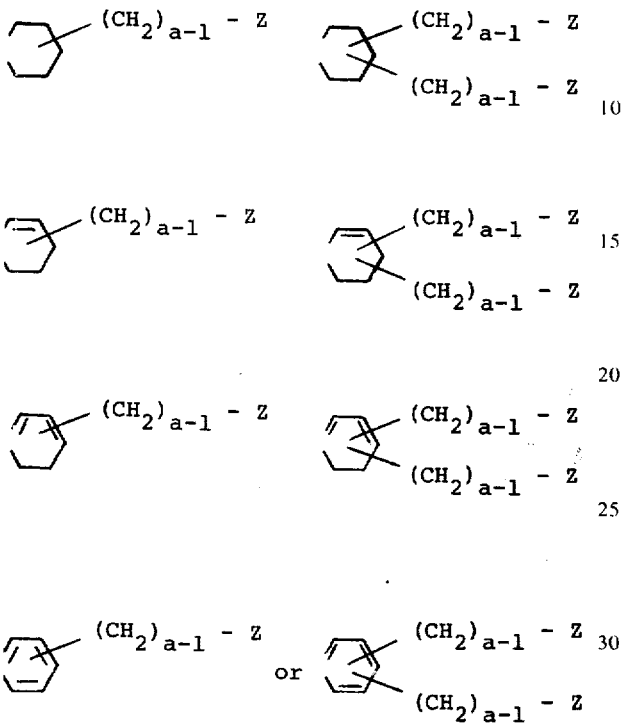

In general, the R radicals may possess from 1 to about 30 carbon atoms.

In the above formula (I), the anion may be, for example, sulfate, sulfonate, or phosphonate.

Illustrative examples of such compounds are dimethyl di(βhydroxyethyl) ammonium p toluene sulfonate, the N,N'-dimethyl, N,N'-di(βhydroxyethyl)piperazine di p-toluene sulfonate, the methylethyl di (β-hydroxyethyl) ammonium p-toluene sulfonate, the trimethyl (hydroxy-2-carbomethoxy-5) benzyl ammonium p-toluene sulfonate, and the p-toluene sulfonates of benzylmethyl-di-(βhydroxyethyl) ammonium, of dibenzyl di(βhydroxyethyl) ammonium, of benzyl tri (βhydroxyethyl) ammonium, of methylbenzyl di (γcarboxypropyl) ammonium, of dimethyl di (γcarboxypropyl) ammonium, of dibenzyl di (γcarboxypropyl) ammonium, of trimethyl paracarboxy benzyl ammonium, of dimethyl (ω-hydroxyhexyl)benzylammonium, of methyl dibutyl ω-carboxydecyl ammonium and of trimethyl(ω-carboxyethyl)decylammonium, etc.

The instant polyesters display good dyeing affinity for acid, simple and metalliferous dyes. This dyeing affinity holds particular interest when the polymers must be used for the manufacture of threads and fibers.

Polyesters containing 1 – 3% of units from product (I), with respect to the total number of the polyesters recurring units, are generally preferred, on technical, practical and economic grounds.

Articles that are so dyed offer a particular lightfastness and also are quite resistant to washing, to degreasing and to sublimation, the dyes being chemically bonded to the fiber.

Further, mixed polyester-wool cloths may be dyed in a single bath, and this represents an assured economic advantage.

Furthermore, articles may be made when starting from dyeable threads admitting basic dyes (polyesters which are modified by $SO_2Na$ sites, for instance) and with threads admitting acid dyes according to the invention. By dyeing raw items with base an acid dyes, contrasting color effects may be achieved, each thread only admitting its own dye.

The process according to this invention holds particular interest when polyesters from $C_4$ and higher dihydric alcohols are utilized, even though worthwhile results are achieved with $C_2$ dihydric alcohol polyesters. It is notably surprising that products containing one anion and one cation of quaternary ammonium may endow the ensuing polymers with dyeing affinity for acid dyes.

In the examples below, parts and percentages refer to weights, except when indicated otherwise; the examples are provided for illustration and do not limit the scope of the invention.

In these examples, the dyes are designated by their reference CI, 1956 edition of the Colour Index and its supplements, and the viscosity index IV is determined by the viscosity in solution measured at 25° C., where the solution consists of 1% weight per volume of polymer in orthochlorophenol, and given by the formula, $$IV = \frac{\text{specific viscosity}}{\text{concentration}} \times 1,000$$

where concentration is expressed in ram/liter.

EXAMPLE 1

Dimethyl di (βhydroxyethyl) ammonium para-toluene sulfonate (A) is prepared from methyl diethanolamine being added slowly and with stirring to methyl para-toluene sulfonate. Product (A) is rinsed and dried under slightly lowered pressure.

While stirring, sebacoyl chloride is slowly added to product (A) and in stoichiometric quantities; heat is applied to raise the temperature to 150°C. while the pressure is lowered to one torr or mm Hg., and this pressure and this temperature are then maintained for three hours. Thereupon, a rubbery, light yellow polymer (B) has been obtained.

Simultaneous loadings proceed in a stainless steel container, namely:

| | |
|---|---|
| dimethyl terephthalate | 3,880 parts |
| ethyleneglycol | 3,100 parts |
| manganese acetate | 1.9 parts |
| trivalent antimony oxide | 1.6 parts |

The methanol formed by the reaction is heated and distilled; the excess glycol also is heated and distilled.

When the temperature reaches 225° C., 0.63 parts phosphorous acid are added; at 230° C., 96 parts of a 20% titanium oxide glycolic suspension are added. When the entire substance reaches a temperature of 240°C., the pressure is gradually lowered to 0.5 torr or mm Hg. over 40 minutes, while the temperature is being raised to 287° C.

After 45 minutes of polycondensation, the vacuum is terminated by nitrogen insertion, 190 parts of polymer (B) are added, and vacuum is again set up for 15 minutes while the substance is being stirred.

A slightly yellow polymer is obtained which is then poured and granulated. It has a viscosity index of 58 and a softening point at 258.9 C.

After three hours of drying at 160°C., the granules are melted and extruded through a spinneret with 23 holes of 0.34 mm diameter each, and the filaments so obtained are rewound at a speed of 75 meter/minutes and thereafter drawn over a pin and plate under the following conditions:

| pin temperature | 75° C. |
|---|---|
| plate temperature | 100° C. |
| drawing ratio | 4.8 X |
| speed of drawing | 100 meter/minute |

The thread so obtained has a strength of 74 dtex/23 strands, a dry resistance of 23.3 g/tex, and a dry elongation of 17°.

A hank of 20 gm of this thread is then immersed in a bath of the followng composition:

| Cl acid red 174 | 0.4 gm |
|---|---|
| diammonium phosphate | 1 |
| condensates of stearyl and oleyl-amines on ethylene oxide | ½ |
| water | enough for 1000 ml. |
| acetic acid | enough for a pH of 3-4 |
| trichlorobenzene | 10 gm |

After boiling 45 minutes in this bath, the thread is washed at 60° C. in an aqueous solution containing 1.5% of an alkyl sulfate and allowed to dry. The thread is a deep red. This dye will not disappear after a 20-minute water and methylene chloride extraction.

An ethylene glycol-polyterephthalate thread was used as a control; it was prepared similarly except that it lacked polymer (B) during polycondensation; this control was only a pale pink which disappeared during washing under the same conditions as above at 60° C.

EXAMPLE 2

Using a stainless steel container, one proceeds with simultaneous loading of:

| dimethyl terephthalate | 3,880 parts |
|---|---|
| butanediol-1,4 | 2,250 parts |
| triethanolamine polytitanate, in stoichiometric quantities | 0.9 parts |

All of the methanol formed is heated and distilled, then 88 parts of 20% of titanium oxide in butanediol/-suspension are added when the temperature is at 245° C. Pressure is reduced to 1 torr or mm Hg. over a period of 40 minutes, while the material is heated up to 255° C.

After 45 minutes of polycondensation, 122 parts of product (A) as described in Example 1 are added and polycondensation proceeds for 15 minutes.

The polymer then is poured, cooled and granulated. It is very white and has a viscosity index of 96. Its molten viscosity index at 260° C. is 1,400 poises; the softening temperature is 221.3° C.

After 2 hours' drying at 140°C., the granulated substances are melted and extruded through a spinneret with 33 holes each of 0.50 mm diameter by means of a press; the rewinding speed is 1,300 meter/minute.

The filaments are drawn over a pin and plate under the following conditions:

| pin temperature | 85° C. |
|---|---|
| plate temperature | 165° C. |
| drawing ratio | 2.2 X |
| drawing speed | 650 meter/minute |

The thread so obtained has a strength of 167 dtex/33 strands, a dry resistance of 42.1 g/tex and a dry elongation of 16%.

A hank of 20 gm. of this thread is immersed into a bath with the following composition:

| Cl acid blue 40 | 0.4 gm |
|---|---|
| diammonium phosphate | 1 |
| stearyl and oleyl amine condensates on ethylene oxide | ½ |
| water | enough for 1,000 ml |
| acetic acid | enough for a pH of 3-4 |

EXAMPLE 3

Methyl-ethyl di (βhydroxyethyl) ammonium para-toluene sulfonate (C) is prepared by slowly adding ethyldiethanolamine to methyl para-toluene sulfonate in equal molecular quantity and by heating to 150°C for 2 hours.

In a reagent-container at 20 torrs or mm Hg pressure, 1595 parts of adipoyl chloride are slowly added to 2,780 parts of product C. The temperature rapidly rises to 80°C and heating lasts three hours at 150°C and 1 ½ torr or mm Hg.

A very viscous, slightly yellow polymer D is obtained.

This polymer is mixed at the ratio of 4% to ethylene glycol polyterephthalate which has a viscosity of 2,800 poises in the molten state at 285°C; the mixture is extruded through a spinneret with 252 apertures each of 0.23 mm diameter by means of a double-screw press.

The filaments so obtained then are drawn by 4.1 X in an aqueous bath containing 3% mineral oil and at 67°C; the drawing speed is 100 meter/minute. The filaments then have a rating of 3.3 dtex, a dry toughness of 25.2 g/tex, and an elongation when dry of 34.1%.

20 gm of staple fibers of the material so obtained is immersed into a bath made up of:

| Cl acid green 88 | 0.4 gm |
|---|---|
| diammonium phosphate | 1 |
| stearyl and oleyl amines condensate on ethylene oxide | 0.5 |
| water | enough for 1,000 ml |
| acetic acid | enough for a pH of 5 |
| trichlorobenzene | 10 gm. |

Following 30 minutes boiling, the bath is exhausted. After washing at 60°C in an aqueous solution containing 1.5% of an alkyl sulfate, after rinsing and being let to dry, the fibers are green colored, and this coloration remains fast under water and methylene chloride extraction.

A control similarly prepared as above but lacking polymer D and immersed in the same dye bath, only assumes a slight yellow-greenish coloration which vanishes upon washing at 60°C.

EXAMPLE 4

200 parts of N,N' bis (βhydroxyethyl) piperazine and 420 parts of methyl para-toluene sulfonate are loaded simultaneously into a reagent-container. The mixture is heated for 2 hours at 140°C. The produce so obtained is recrystallized in methanol and dried under vacuum.

This is N,N'-dimethyl N,N'-di (βhydroxyethyl)piperazine di-para-toluene sulfonate (E).

In a stainless steel reagent-container there is simultaneously loaded and stirred:

| | |
|---|---|
| dimethyl terephthalate | 388 parts |
| butanediol 1,4 | 255 |
| stoichiometric quantities of triethanol amine polytitanate | 0.09 |

The alcohol interchange begins at about 155°C. After 2 ½ hours, all of the methanol which was produced has been distilled and the substance's temperature has reached 245°C.

Then, over a period of 40 minutes, the pressure is gradually reduced to 1 torr or mm Hg while the substance's temperature is raised to 225°C. After 45 minutes of polycondensation, the vacuum is terminated by nitrogen insertion; 11 parts of product E are added and polycondensation proceeds 10 minutes.

A white polymer F is obtained which is poured in water, then ground into particles of dimensions ranging from 0.2 to 0.5 mm. Two grams of this power are placed into a bath made up of:

| | |
|---|---|
| Cl acid red 228 | 0.04 gm |
| diammonium phosphate | 0.1 |
| stearyl and oleyl amine condensate on ethylene oxide | 0.05 |
| water | enough for 100 ml |
| acetic acid | enough for a pH of 5. |

After 30 minutes boiling at atmospheric pressure, the bath is practically exhausted and the powder has assumed a red-violet color which remains after washing at 60°C in an aqueous solution containing 1.5% of an alkyl sulfate and after water or methylene chloride extraction.

A polyterephthalate of tetramethyleneglycol, used as a control and prepared and dyed under identical conditions except for the addition of product E, assumes only a slightly pink coloration which almost entirely vanishes upon washing and completely so upon extraction.

EXAMPLE 5

In a reagent-container provided with a stirrer and with a device for bubbling-through gases, the following loading takes place simultaneously:

| | |
|---|---|
| methyl parahydroxybenzoate | 456 gm |
| trioxymethylene | 112.5 |
| zinc chloride | 75 |
| chloroform | 1,800 |

All of it will have dissolved when the temperature range of 40° – 45°C has been reached. Then the hydrochloric acid is bubbled through for three hours at that temperature.

After washing, one obtains hydroxy-1 chloromethyl-2 carbomethoxy-4 benzene, which is brought to boiling in the benzene with dimethylamine for a period of eight hours. Following precipitation and filtering, the hydroxy-1 N-dimethylamino-ethyl-2 carbomethyoxy-4 benzene crystallizes in the methanol.

In an atmosphere of nitrogen and while stirring, 52.25 parts of this product are loaded together with 46.5 parts of methyl paratoluene sulfonate.

Upon slight heating, the temperature rises spontaneously to about 80°C and stirring is stopped after 20 minutes. The substance is left at rest for one night. After purification, one obtains 75 parts of trimethyl-(hydroxy-2carbomethoxy-5) benzylammonium paratoluene sulfonate (F).

The polycondensation conditions of Example 4 then are repeated by replacing product E with product F. The polymer which is obtained following grinding is in the form of a very light yellow powder. Two grams of this powder are placed in a bath made up of:

| | |
|---|---|
| Cl acid blue 40 | 0.04 gm |
| diammonium phosphate | 0.1 |
| stearyl and oleyl amine condensate on ethylene oxide | 0.05 |
| water | enough for 100 ml |
| acetic acid | enough for a pH of 3–4. |

After 30 minutes boiling, the powder assumes a blue coloration which persists after washing and extraction.

EXAMPLE 6

In a stainless steel reagent-container, the following are loaded simultaneously and while stirring takes place:

| | |
|---|---|
| dimethyl terephthalate | 2,028 parts |
| dimethyl isophthalate | 676 |
| dihydroxymethyl-1,4 cyclohexane | 2,534 |
| butyl orthotitanate | 6.8 |

The temperature is rapidly raised to 260°C; after 1 ½ hours, and over a period of 20 minutes, the pressure is reduced to 1 torr or mm Hg.

After 1 ¾ hours, 150 parts of product B described in Example 1 are added, the vacuum having been terminated by nitrogen insertion.

Polycondensation proceeds for 10 minutes; then the polymer is poured and granulated. It has the appearance then of very transparent yellow cashew with a softening point of 237°C and a molted viscosity of 1,550 poises at 260°C.

The dried polymer is melted at 265°C and extruded through a spinneret with 23 orifices each of 0.34 mm diameter and at a drawing speed of 75 meter/minute.

The filaments so obtained are drawn on a plate at 100°C and at a ratio of 4X; speed of drawing is 33 meter/minute.

A thread is thus produced with a strength of 98 dtex/23 strands, with a resistance of 13.3 g/tex and a dry elongation of 29.8%.

A hank of 20 gm of this thread is immersed in a bath of the following composition:

| | |
|---|---|
| Cl acid red 266 | 0.4 gm |
| diammonium phosphate | 1 |
| stearyl and oleyl amine condensate on ethylene oxide | ½ |
| water | enough for 1,000 ml |
| orthophenylphenol | 10 gm |
| acetic acid | enough for a pH of 3–4. |

Following 45 minutes of boiling in this bath and washing at 60°C in an aqueous solution of 1.5% alkyl sulfate, the thread is red and its coloration persists following 20 minutes of water and methylene chloride extraction.

A thread obtained from a copolyester and prepared in the same manner but lacking product B, when used as a control, assumes only a very slight pink coloration which disappears completely following washing at 60°C in the same detergent solution as above.

EXAMPLE 7

Trimethyl(ω-carboxyethyl)decylammonium p-toluene sulfonate was prepared by adding 23 g of ethyl 11bromoundecanoate to 300 ml of dimethylamine (in a solution at 33% in benzene) in 300 ml of benzene, mixing at room temperature and heating at 70°C during 5 hours.

A precipitate of dimethylammonium bromide was formed and filtered; the benzenic phase containing dimethyl (ω-carboxyethyl)decylamine was acidifed with concentrated hydrochloric acid.

The product obtained was extracted with water, and the aqueous phase was saturated with sodium hydroxide: an oil is separated, dried, and distillated under vacuum to give 196 g of a colorless liquid.

The amine thus prepared, 20 g, is poured into a reactor containing 14.8 g of methyl paratoluene sulfonate; the reaction medium is stirred under nitrogen; at the end of addition the mass temperature rises up to 180°C and after cooling the solid thus obtained is again crystallized in a mixture of ethanol/ether 25/75. Trimethyl (ω-carboxyethyl) decylammonium paratoluene sulfonate in an amount of 28.5 g resulted.

In a stainless steel reagent container the following compounds are loaded simultaneously, under continuous stirring:

| | |
|---|---|
| dimethylterephthalate | 388 g (2 mols) |
| butanediol-1.4 | 285 g (2.5 mols) |
| triethanolamine polytitanate | 88 mg |

The alcohol interchange begins at about 163°C. After 1 hour, all the methanol produced has been distilled off and 88 mg of triethanolamine polytitanate and 8.8 g of a 20% titanium oxide in butanediol-1.4 suspension are added, while the medium is heated up to 250°C. Pressure is reduced to 1 torr over a period of 30 minutes, while the temperature of the medium reaches 255°C.

After 1 hour of polycondensation 27.7 g of trimethyl(ω-carboxyethyl) decylammonium paratoluene sulfonate are added and the polycondensation is continued for 20 minutes. The polymer is poured, and granulated. Its viscosity index is 62.5 and its softening point 225°C.

2 grams of this powder are placed into a bath made of:

| | |
|---|---|
| CI acid blue 40 | 0.04 g |
| diammonium phosphate | 0.1 g |
| stearyl amine and oleyl amine condensate on ethylene oxide | 0.05 g |
| water | enough for 100 ml |
| acetic acid | enough for pH of 3-4. |

After 30 minutes of boiling at atmospheric pressure, the polymer has an intense blue coloration, the dyeing bath is quite exhausted after 30 minutes and the coloration of the polymer persists after washing and extraction.

EXAMPLE 8

Example 4 of U.S. Pat. No. 3,325,454 is repeated except that the quaternary ammonium used, is 1 % mol of dimethyldi(β-hydroxyethyl)ammonium paratoluene sulfonate.

No polycondensation was possible, because said compound hindered esterification and no polymer could be obtained.

EXAMPLE 9

Example 5 of U.S. Pat. No. 3,039,998 has been repeated except that the tetra-ethanol ammonium terephthalate is replaced by 1 % by weight of dimethyl bis-(β-hydroxyethyl)ammonium p-toluene sulfonate.

The reaction mixture becomes brown at about 280°C and no further polycondensation is possible. No polymer could be obtained.

What is claimed is:

1. A melt spinnable composition consisting essentially of
   a polyester of at least one aromatic dicarboxylic acid or an ester thereof and at least one dihydric alcohol, and
   1 - 10% of units, with respect to the sum of the recurring units of said polyester, issuing from a product having the formula

 (1)

wherein the R's represent aliphatic, cycloaliphatic or aromatic radicals, at least one R being substituted by at least a group capable of forming ester bond with the recurring polyester units, the total number of said ester bonds forming groups being no greater than three,
   at least two R's being capable of forming between them a ring which may contain quaternizable nitrogen atoms;
   $X^{n-}$ is a stable anion of valency n and selected from the group consisting of sulfate, sulfonate and phosphonate anions; and
   Y is an integer equal to the valence of the anion.

2. A melt spinnable composition according to claim 1 containing 1 - 10% of units issuing from an aliphatic dicarboxylic acid.

3. A melt spinnable composition according to claim 1, containing 1 - 3% of units issuing from the product of formula I with respect to the recurring units of the polymer.

4. A melt spinnable composition according to claim 1, wherein the aromatic dicarboxylic acid contains about 8 to about 14 carbon atoms and the dihydric alcohols are aliphatic or cycloaliphatic alcohols which contain 2 - 10 carbon atoms.

5. A melt spinnable composition according to claim 1, wherein R is an aliphatic radical represented by the formula

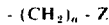

where a is an integer from 1 - 12 and Z is H, COOH, COOR', or OH where R' is an alkyl of 1 to 10 carbon atoms.

6. A melt spinnable compositon according to claim 1 where R is an aromatic radical of the formula

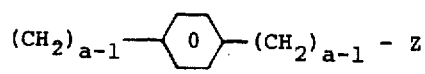

where a is an integer of 1 – 12 and Z is H, COOH, COOR', or OH where R' is an alkyl of 1 to 10 carbon atoms.

7. A melt spinnable composition according to claim 1 where R is a cycloaliphatic radical represented by the formula

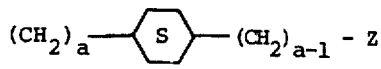

where a is an integer from 1 – 12 and Z is H, COOH, COOR', or OH where R' is an alkyl of 1 to 10 carbon atoms.

8. A melt spinnable composition according to claim 1, wherein at least two R's form rings of the formula

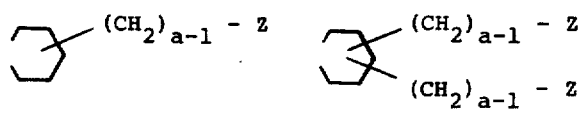

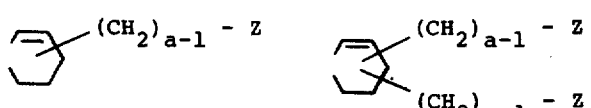

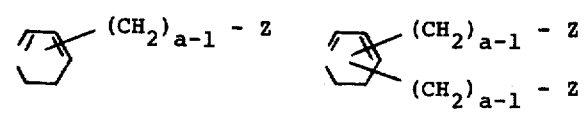

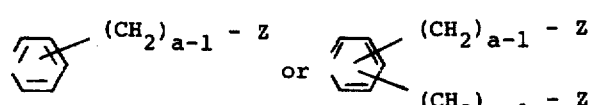

where a is an integer from 1 – 12 and Z is H, COOH, COOR', or OH, where R' is an alkyl of 1 to 10 carbon atoms.

9. A process for producing a melt spinnable composition according to claim 1 comprising
reacting at least an aromatic dicarboxylic acid or an ester thereof with at least one dihydric alcohol,
then polycondensing the product thus obtained in the presence of 1 – 10% mols with respect to the number of mols of the dicarboxylic acid or derivative thereof, of the product of formula (I) as defined in claim 1.

10. A process for producing a melt spinnable composition according to claim 1 comprising
reacting at least an aromatic dicarboxylic acid or ester thereof and an aliphatic dicarboxylic acid with at least one dihydric alcohol,
then polycondensing the product thus obtained in the presence of 1 – 10% mols with respect to the number of mols of the dicarboxylic acid or ester thereof, of the product of formula (I) as defined in claim 1.

11. A process for producing a melt spinnable composition according to claim 1 comprising
reacting at least an aromatic dicarboxylic acid or an ester thereof with at least one dihydric alcohol,
then polycondensing the product thus obtained in the presence of a polymer formed by reacting the product (I) as defined in claim 1 with a dicarboxylic acid or an ester thereof, whereby the concentration of the product (I) is 1 – 10% mols with respect to the total number of mols of dicarboxylic acid or derivative thereof.

12. A process for producing a melt spinnable composition comprising
mixing with a polyester a polymer formed by reacting the product (I) as defined in claim 1 with a dicarboxylic acid or an ester thereof, the total number of units of product (I) being 1 – 10% mols of the total recurring polyester units in the mixture.

13. Filaments consisting essentially of the melt spinnable composition of claim 1.

* * * * *